United States Patent [19]

Biliris et al.

[11] Patent Number: 5,966,706
[45] Date of Patent: *Oct. 12, 1999

[54] LOCAL LOGGING IN A DISTRIBUTED DATABASE MANAGEMENT COMPUTER SYSTEM

[75] Inventors: Alexandros Biliris, Chatham; Hosagrahar Visvesvaraya Jagadish, Berkeley Heights; Euthimios Panagos; Rajeev R. Rastogi, both of New Providence, all of N.J.

[73] Assignees: AT&T Corp, New York, N.Y.; Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/803,042

[22] Filed: Feb. 19, 1997

[51] Int. Cl.[6] ................................... G06F 17/30
[52] U.S. Cl. .......................... 707/10; 707/1; 707/8; 707/100; 707/102; 707/2
[58] Field of Search ............... 707/3, 10, 101, 707/4, 2, 100, 102, 103, 200

[56] References Cited

U.S. PATENT DOCUMENTS

| | | | |
|---|---|---|---|
| 5,261,089 | 11/1993 | Coleman et al. | 707/1 |
| 5,410,684 | 4/1995 | Ainsworth et al. | 395/575 |
| 5,446,884 | 8/1995 | Schwendemann et al. | 707/1 |
| 5,448,727 | 9/1995 | Annevelink | 707/101 |
| 5,454,102 | 9/1995 | Tang et al. | 707/3 |
| 5,530,802 | 6/1996 | Fuchs et al. | 395/183.1 |
| 5,687,363 | 11/1997 | Oulid-Aissa et al. | 707/4 |
| 5,721,909 | 2/1998 | Oulid-Aissa et al. | 707/10 |
| 5,764,877 | 6/1998 | Lomet et al. | 707/3 |
| 5,764,897 | 6/1998 | Khalidi | 395/200.31 |
| 5,794,229 | 8/1998 | French et al. | 707/2 |
| 5,806,065 | 9/1998 | Lomet | 707/8 |

*Primary Examiner*—Wayne Amsbury
*Assistant Examiner*—Shahid Alam

[57] ABSTRACT

A distributed database management computer system includes a plurality of nodes and a plurality of database pages. When a first node in the computer system updates a first database page, the first node generates a log record. The first node determines whether it manages the first database page. If the first node determines that it manages the first database page, the first node writes the log record to a log storage local to the first node. However, if the first node determines that it does not manage the first database page, the first node then determines whether it includes a local log storage. If the first node includes a local log storage, the first node writes the log record to the local log storage, even if the first node does not manage the first database page. If the first node does not include a local log storage, the first node sends the log record to a second node managing the first database page.

8 Claims, 2 Drawing Sheets

FIG. 3

LOCAL LOGGING IN A DISTRIBUTED DATABASE MANAGEMENT COMPUTER SYSTEM

I. FIELD OF THE INVENTION

The present invention is directed to a distributed database management computer system. More particularly, the present invention is directed to a distributed database management computer system which includes local logging of nodes and associated transaction recovery techniques.

II. BACKGROUND OF THE INVENTION

The proliferation of inexpensive workstations and networks has created a new era in distributed computing. At the same time, non-traditional applications such as computer aided design (CAD), computer aided software engineering (CASE), geographic information systems (GIS), and office information systems (OIS) have placed increased demands for high-performance transaction processing on database systems. The combination of these factors gives rise to significant performance opportunities in the area of distributed transaction processing.

Today, the major distributed database management computer systems are "client-server", "shared nothing" and "shared disks" architectures. Most of these architectures use logging for recovery. In a client-server system, both the database and the log are stored with the server and all log records generated by the clients are sent to the server. In a shared nothing system, the database is partitioned among several nodes and each node has its own log file. Each database partition is accessed only by the owning node and a distributed commit protocol is required for committing transactions that access multiple partitions. In a shared disks system, the database is shared among the different nodes. Some shared disks systems use only one log file and require system wide synchronization for appending log records to the log. An example of this known type of system is disclosed in T. Rengarajan et al., *High Availability Mechanisms of VAX DBMS Software*, Digital Technical Journal 8, pages 88–98, February 1989. Some other shared disks systems use a log file per node. An example of this known type of system is disclosed in D. Lomet, *Recovery for Shared Disk Systems Using Multiple Redo Logs*, Technical Report CLR 90/4, Digital Equipment Corp., Cambridge Research Lab, Cambridge, Mass., October 1990. However, these systems either force pages to disks when these pages are exchanged between two nodes or they merge the log files during a node crash.

Figure 1:
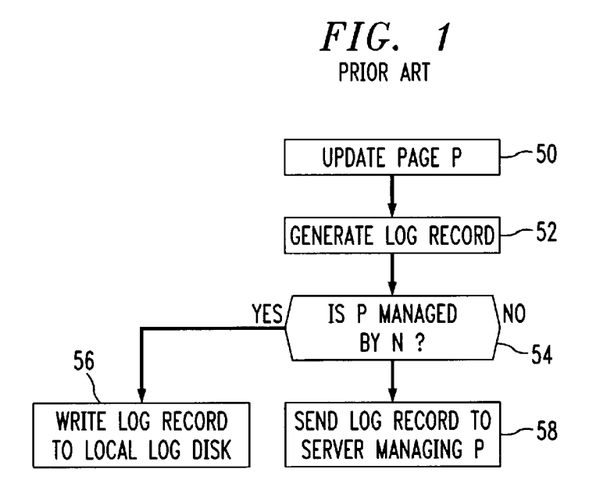
FIG. 1 is a flowchart illustrating the steps performed by prior art systems when a database page is updated by an application running on a node.

FIG. 1 is a flowchart illustrating the steps performed by most known systems when a database page "P" is updated by an application running on a node "N." These steps are performed in most known client-server database systems that implement logging, as well as in any other known distributed database management computer systems with multiple nodes N.

In step 50 of FIG. 1, the database page P is updated by node N and stored in N's cache. In step 52, a log record of the update is generated by node N. In step 54, node N determines if page P is managed by node N. If it is, then in step 56, node N writes the log record to a local log disk. However, if at step 54 node N determines that page P is managed by another node, then at step 58 node N sends the log record to the node or server that manages page P.

As shown in the FIG. 1, in most known distributed database management computer systems, log records are always stored local to the node that is managing the database page that created the log record.

Further, in existing client-server database systems, transaction management is carried out exclusively by the server. The main argument for not allowing clients to offer transactional facilities is twofold. First, client machines may not be powerful enough to handle such tasks; the high cost of main memory and disks in the past made it more cost effective to increase the resources of the server rather than the resources of each client. The second, and more important argument, is data availability and client reliability—client machines could be connected to or disconnected from the network or simply turned off at arbitrary times.

Today, advances in hardware and software have resulted in both reliable network connections and reliable workstations that approach server machines regarding of resources. Thus, client reliability concerns become less and less important. Concerns related to availability are more a function of the computing environment rather than of the technology. In many computing environments, such as corporate, engineering, and software development, client workstations are connected to the server(s) all the time. Of course, disconnection of these machines from the network for some reason does happen but it is a rare event (say, once a month) and can be handled in an orderly fashion. In such environments, additional performance and scalability gains are realized when clients offer transactional facilities, because dependencies on server resources are reduced considerably.

The following sections (sections A–C) discuss known client-server, shared disks, and distributed file systems and shortfalls present in each system.

A. Client-Server Systems

A. Delis et al., *Performance and Scalability of Client-Server Database Architectures*, Proceedings of the Eighteenth International Conference on Very Large Databases, Vancouver, British Columbia, pages 610–623, August 1992 discloses an architecture in which local disks are used to store relational query results that are retrieved from the server. However, in the disclosed architecture, transaction management is carried out exclusively by the server and all updates to the database are performed at the server.

*Versant Object Technology*, Menlo Park, Calif. VERSANT System Reference Manual, Release 1.6, 1991 (Versant) is a commercially available object oriented database management system that also explores client disk space. In Versant, users can check out objects by requesting them from the server and store them locally in a "personal database". In addition, locking and logging for objects stored in a personal database can be turned off to increase performance. However, in Versant, the checked out objects are unavailable to the rest of the clients until they are checked in later on. All modified and new objects in the client's object cache must be sent to the appropriate server so that changes can be logged at transaction commit.

In the method disclosed in C. Mohan et al., *ARIES/CSA: A Method For Database Recovery in Client-Server Architectures*, Proceedings of ACM-SIGMOD 1994 International Conference on Management of Data, Minneapolis, Minn., pages 55–66, May 1994 (the "ARIES/CSA method"), clients send all their log records to the server as part of the commit processing. The ARIES/CSA method employs a fine granularity concurrency protocol that prevents clients from updating the same page concurrently by using the update token approach disclosed in C. Mohan et al., *Recovery and Coherency Control Protocols for Fast Intersystem Page Transfer and Fine-Granularity Locking in* a *Shared Disks Transaction Environment*, Proceedings of the Seventeenth International Conference on Very Large Databases, Barcelona, Spain, pages 193–207, September 1991. In the ARIES/CSA method, clients do not send modified pages to the server at transaction commit and transaction rollback is performed by clients. However, client crashes are still handled by the server. Client checkpoints in the ARIES/CSA method are stored in the log maintained by the server and server checkpointing requires communication with all connected clients.

A comprehensive study of performance implications of granularities for data transfer, concurrency control, and coherency control in a client-server environment is presented in M. Carey et al., *Fine-Grained Sharing in a Page Server OODBMS*, Proceedings of ACM-SIGMOD 1994, International Conference on Management of Data, Minneapolis, Minn., pages 359–370, May 1994. In the disclosed scheme, it is assumed that copies of all updated data are sent back to the server at transaction commit. While concurrent updates on the same page are handled by merging individual updates, no recovery techniques are disclosed.

B. Shared-Disks Systems

E. Rahm, *Recovery Concepts for Data Sharing Systems*, Proc. 21st Int. Conf. on Fault-Tolerant Computing, Montreal, June 1991 discloses logging and recovery protocols for a shared disks architecture employing the "primary copy authority" (PCA) locking protocol. Under the PCA locking protocol, the entire lock space is divided among the participating nodes and a lock request for a given item is forwarded to the node responsible for that item. PCA supports only physical logging, not logical logging. PCA employs the no-steal buffer management policy in which only pages containing committed data are written to disk. This is an inflexible and expensive policy.

PCA allows pages to be modified by many systems before they are written to disk. However, commit processing involves the sending of each updated page to the node that holds the PCA for that page. Furthermore, double logging is required for every page that is modified by a node other than the PCA node. During normal transaction processing the modifying node writes log records in its own log and at transaction commit it sends all the log records written for remote pages to the PCA nodes responsible for those pages.

C. Mohan et al., *Recovery and Coherency Control Protocols for Fast Intersystem Page Transfer and Fine-Granularity Locking in a Shared Disks Transaction Environment*, Proceedings of the Seventeenth International Conference on Very Large Databases, Barcelona, Spain, pages 193–207, September 1991 ("Mohan et al.") discloses four different recovery schemes for a shared disk architecture. The schemes are designed to exploit the fast internode communication paths usually found in tightly coupled data sharing architectures, and they use fine granularity locking. However, the schemes assume that the clocks of all the nodes are perfectly synchronized. In addition, the simple and medium schemes disclosed in Mohan et al. force pages to disk when they are exchanged between nodes, and all of the disclosed schemes require merging of the local logs. In the fast and super-fast schemes disclosed in Mohan et al., private logs have to be merged even in the case where only a single node crashes.

D. Lomet, *Recovery for Shared Disk Systems Using Multiple Redo Logs*, Technical Report CLR 90/4, Digital Equipment Corp., Cambridge Research Lab, Cambridge, Mass., October 1990 discloses a shared data/private log recovery algorithm. However, the recovery algorithm requires a seamless ordering of page sequence numbers (PSNs) and associates for each database page extra information with the space management subsystem. In addition, the disclosed recovery algorithm forces modified pages to disk before they are replaced from a node's cache.

T. Rengarajan et al., *High Availability Mechanisms of VAX DBMS Software*, Digital Technical Journal 8, pages 88–98, February 1989 discloses a Rdb/VMS that is a data sharing database system executing on a VAX cluster. Earlier versions of Rdb/VMS employed an undo/no-redo recovery protocol that required, at transaction commit, the forcing to disk of all the pages updated by the committing transaction. More recent versions, disclosed in D. Lomet et al., *How the Rdb/VMS Data Sharing System Became Fast*, Technical Report CRL 92/4, Digital Equipment Corporation Cambridge Research Lab, 1992, offer both an undo/no-redo and an undo/redo recovery scheme. In addition, a variation of the callback locking algorithm, referred to as "lock carryover", is used for reducing the number of messages sent across the nodes for locking purposes. However, Rdb/VMS does not allow multiple outstanding updates belonging to different nodes to be present on a database page. Thus, modified pages are forced to disk before they are shipped from one node to another.

In Rdb/VMS, each application process can take its own checkpoint after the completion of a particular transaction. The checkpointing process forces to disk all modified and committed database pages. In addition, Rdb/VMS uses only one global log file. Consequently, the common log becomes a bottleneck and a global lock must be acquired by each node that needs to append some log records at the end of the log.

C. Distributed File Systems

M. Satyanarayanan et al., *Coda: A Highly Available File System for a Distributed Workstation Environment*, IEEE Transactions on Computers, 39(4), April 1990 ("Coda") discloses a distributed file system operating on a network of UNIX workstations. Coda is based on the Andrew File System and cache coherency is based on the callback locking algorithm. The granularity of caching is that of entire files and directories. Coda can handle server and network failures and support portable workstations by using client's disks for logging. This ability is based on the disconnected mode of operation that allows clients to continue accessing and modifying the cached data even when they are not connected to the network. All updates are logged and they are reintegrated to the systems on reconnection.

However, Coda does not support failure atomicity, and updates cannot be rolled back. In addition, Coda does not guarantee that the updates performed by a transaction survive various system failures and they are altered only when a later transaction modifies them. Coda only guarantees permanence conditionally; updates made by a transaction may change if a conflict is discovered at the time these updates are being reintegrated into the system.

Based on the foregoing, there is a need for a distributed database management system in which: (1) updated pages are not forced to disk at transaction commit time or when they are replaced from a node cache, (2) transaction rollback and node crash recovery are handled exclusively by the nodes, (3) local log files are never merged during the recovery process, (4) each node can take a checkpoint without synchronizing with the rest of the operational nodes, and (5) clocks do not have to be synchronized across the nodes and lock tables are not checkpointed.

III. SUMMARY OF THE INVENTION

The present invention is a distributed database management computer system that includes a plurality of nodes and a plurality of database pages. When a first node in the computer system updates a first database page, the first node generates a log record. The first node determines whether it manages the first database page. If the first node determines that it manages the first database page, the first node writes the log record to a log storage local to the first node. However, if the first node determines that it does not manage the first database page, the first node then determines whether it includes a local log storage. If the first node includes a local log storage, the first node writes the log record to the local log storage, even if the first node does not manage the first database page. If the first node does not include a local log storage, the first node sends the log record to a second node managing the first database page.

V. DETAILED DESCRIPTION

Figure 2:
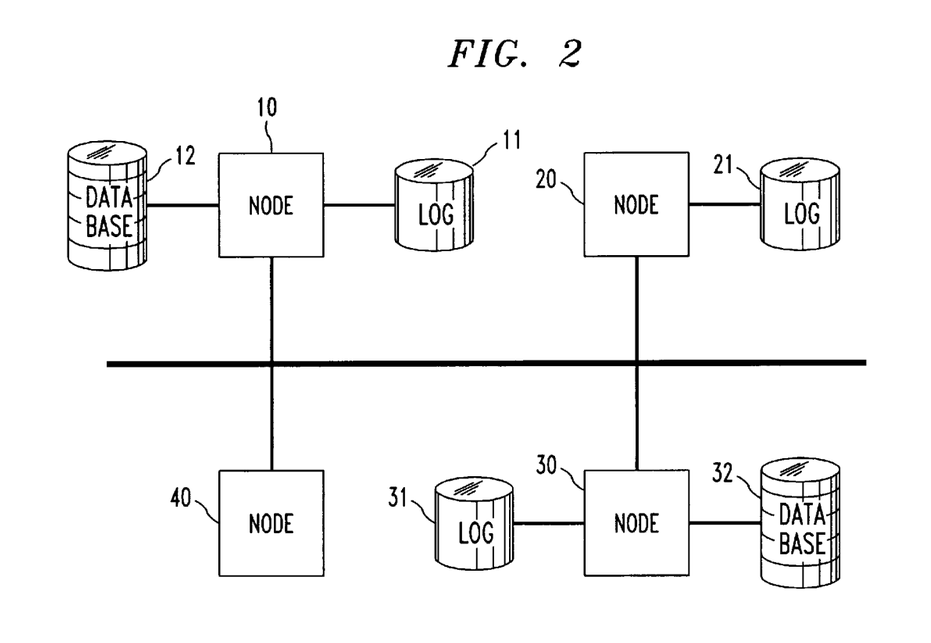
FIG. 2 is a block diagram of an exemplary distributed database management computer system that implements the present invention.

FIG. 2 is a block diagram of an exemplary distributed database management computer system that implements the present invention. The present invention can be implemented with a variety of distributed computing environments. It can be implemented in both shared nothing and shared disks architectures. It can also be implemented in client-server architectures where client disks are used for logging and peer-to-peer architectures. An example of such a system is disclosed in M. J. Carey et al., *Shoring Up Persistent Applications*, Proceedings of ACM-SIGMOD 1994 International Conference on Management of Data, Minneapolis, Minn., pages 383–394, May 1994.

The system of FIG. 2 consists of several networked processing nodes 10, 20, 30, 40. Nodes 10, 20, 30, 40 can also be referred to as clients and servers in a client/server arrangement. Some nodes have databases attached to it. For example, node 10 has database 12 attached to it, and node 30 has database 32 attached to it. A node having databases attached to it is referred to as "owner node" with respect to the items stored in these databases. All owner nodes have local logs. Therefore, node 10 has local log 11 and node 30 has local log 31. Nodes that do not own any database, such as nodes 20 and 40, may or may not have local logs. As shown, node 20 has local log 21. Although nodes with no local logs may participate in a distributed computation, the present invention applies only to nodes that have local logs.

A user program running on node N accesses data items that are owned by either N or some other remote node. These data items are fetched in N's cache, i.e., a data shipping architecture is assumed. Log records for data updated by N are written to the local log file and transaction commitment is carried out by N without communication with the remote nodes. To accomplish this, the present invention correctly handles transaction aborts and node crashes, while incurring minimal overhead during normal transaction processing. The present invention includes the following features:

Log records for updates to cached pages are written to the log file of each node.

Transaction rollback and node crash recovery are handled exclusively by each node.

Node log files are not merged at any time.

Node clocks do not have to be synchronized.

Nodes can take checkpoints independently of each other.

Figure 3:
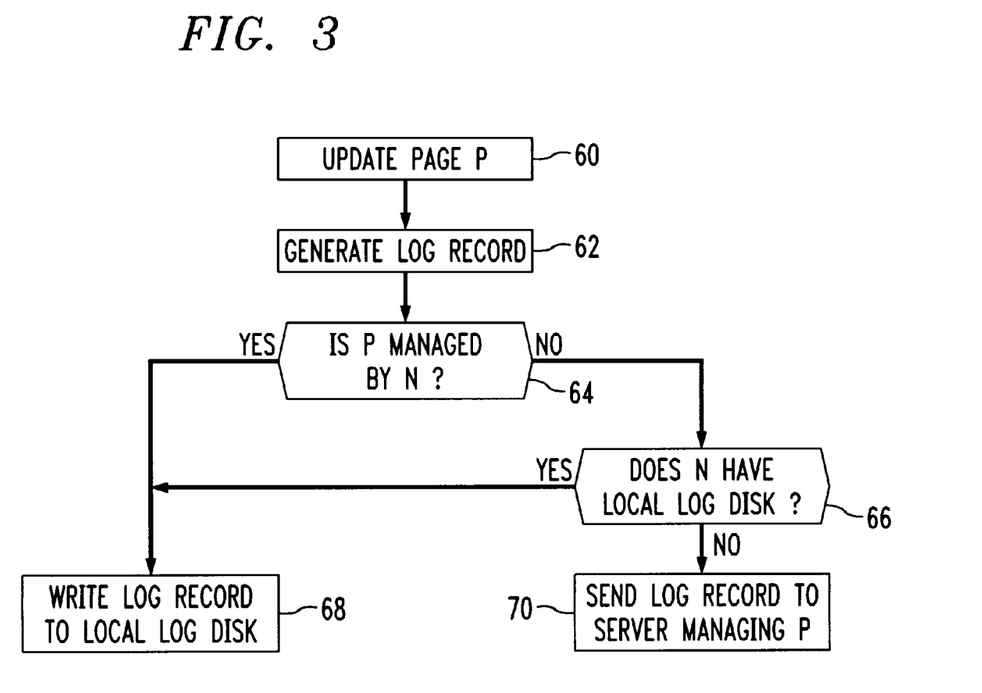
FIG. 3 is a flowchart illustrating an overview of the steps performed by the present invention when a database page is updated by an application running on node.

FIG. 3 is a flowchart illustrating an overview of the steps performed by the present invention when a database page P is updated by an application running on node N.

In step 60 of FIG. 3, the database page P is updated by node N and stored in N's cache. In step 62, a log record of the update is generated by node N. In step 64, node N determines if page P is managed by node N. If it is, then in step 68, node N writes the log record to a local log disk. However, if at step 64 node N determines that page P is managed by another node, then at step 66 node N determines whether it has a local log disk. If node N has a local log disk, then at step 68 the log record is stored in the local log disk. If at step 66 it is determined that node N does not have a local log disk, then at step 70 node N sends the log record to the node or server that is managing page P.

As shown in FIG. 3, in contrast to the steps performed by prior art systems, the present invention allows for local storage of log records at node N even if the page P for which the log record was created is not managed by node N. The following sections include additional details of the steps shown in FIG. 3, and details on how error recovery is accomplished with a system executing the steps shown in FIG. 3

A. Assumptions of the Exemplary System

In the exemplary distributed database management computer system shown in FIG. 2, transactions are executed in their entirety in the node where they are started. Data items referenced by a transaction are fetched from the owner node before they are accessed. The unit of internode transfer is assumed to be a database page. Each node 10, 20, 30, 40 has a buffer pool (node cache) where frequently accessed pages are cached to minimize disk I/O and communication with owner nodes. The buffer manager of each node follows the "steal" and "no-force" strategies. These strategies are known in the art and are disclosed, for example, in T. Haerder et al., *Principles of Transaction Oriented Database Recovery—A Taxonomy*, ACM Computing Survey, pages 289–317, December 1983, incorporated herein by reference. Pages containing uncommitted updates that are replaced from the local cache are either written in-place to disk or sent to the owner node, depending on whether they belong to the local database. Pages that were updated by a terminated transaction (committed or aborted) are not necessarily written to disk or sent to the owner node before the termination of the transaction.

Further, in the distributed database management computer system shown in FIG. 2, concurrency control is based on locking and the strict two-phase locking protocol is used. Each node 10, 20, 30, 40 has a lock manager that caches the acquired locks and forwards the lock requests for data items owned by another node to that node. Each node maintains both the cached pages and the cached locks across transaction boundaries. This is referred to as inter-transaction caching and is disclosed, for example, in K. Wilkinson et al.,

*Maintaining Consistency of Client-cached Data*, Proceedings of the Sixteenth International Conference on Very Large Databases, Brisbane, pages 122–133, August 1990, incorporated herein by reference. The callback locking protocol, disclosed in J. H. Howard, *Scale and Performance in a Distributed File System*, ACM Transactions on Computer Systems, 6(1):51–81, February 1988, incorporated herein by reference, is used for cache consistency.

Further, in the distributed database management computer system shown in FIG. 2, both shared and exclusive locks are retained by the node after a transaction terminates (whether committing or rolling back). Cached locks that are called back in exclusive mode are released and exclusive locks that are called back in shared mode are demoted to shared. The granularity of both locking and callback is assumed to be at the level of a database page. Optionally, fine-granularity locking is supported.

Further, in the distributed database management computer system shown in FIG. 2, each database page consists of a header that among other information contains a page sequence number (PSN), which is incremented by one every time the page is updated. The owner node initializes the PSN value of a page when this page is allocated by following the known approach disclosed in C. Mohan et al., *ARIES/CSA: A Method For Database Recovery in Client-Server Architectures*, Proceedings of ACM-SIGMOD 1994 International Conference on Management of Data, Minneapolis, Minn., pages 55–66, May 1994, incorporated herein by reference (i.e., the PSN stored on the space allocation map containing information about the page in question is assigned to the PSN field of the page).

Further, the log of each node is used for logging transaction updates, rolling back aborted transactions, and recovering from crashes. Recovery is based on the write ahead log (WAL) protocol and the known ARIES redo-undo algorithm (hereinafter referred to as the "ARIES algorithm", or "ARIES"), disclosed in C. Mohan et al., *ARIES: A Transaction Recovery Method Supporting Fine-Granularity Locking and Partial Rollbacks using Write-Ahead Logging*, ACM Transactions on Database Systems, 17(1):94–162, March 1992, incorporated herein by reference, is employed. Log records are written to the local log before an updated page is replaced from the node cache and at transaction commit. Each node log manager associates with each log record a log sequence number (LSN) that corresponds to the address of the log record in the local log file. Log records describing an update on a page contain among other fields the page id and the PSN the page had just before it was updated.

Fine-granularity locking is supported by the system shown in FIG. 2 and several clients may simultaneously update different objects residing on the same page. The present invention can be augmented with an adaptive locking scheme that switches between object and page level locking depending on the degree of data conflicts. However, the specifics of the adaptive scheme are beyond the scope of this application, which concerns logging and recovery.

For concreteness, the detailed description below assumes the scheme of M. Carey et al., *Fine-Grained Sharing in a Page Server OODBMS*, Proceedings of ACM-SIGMOD 1994, International Conference on Management of Data, Minneapolis, Minn., pages 359–370, May 1994, incorporated herein by reference.

When the server receives a page P from some client, it merges the updates present on that page with the version of P that is present in its buffer pool. If there is no copy of P in its buffer pool, the server reads P from the disk first and then it applies the merging procedure. After the server merges two copies of the same page having PSN values $PSN_i$ and $PSN_j$, respectively, it sets the PSN value of the page to be: max $(PSN_i; PSN_j)+1$. We add one to the maximum value to ensure monotonically increasing PSN values when two copies with the same PSN value are merged.

When a client triggers a callback for an object and the server sends the page P containing the object, the client installs the updates present on this object on the version of P that is present in its cache, if any. Similarly to the server merging procedure, the client sets the PSN of the page to be one greater than the maximum of the PSN values present on the two copies that are being merged. In this way, log records written for the same object by different clients contain monotonically increasing PSN values.

In the present invention, it is assumed that each client in the system writes log records for updates to pages in its own log file. It is also assumed that the crashed client performs restart recovery. However, the present invention does not require that each client has a log file, nor does it require that the crashed client is the one that will recover from its failure. In particular, clients that do not have local disk space can ship their log records to the server. In addition, restart recovery for a crashed client may be performed by the server or any other client that has access to the log of this client.

B. Recovery for Page-Level Locking Systems

1. Normal Processing of the Exemplary System

When a node 10, 20, 30, 40 of the exemplary system shown in FIG. 2 wishes to read a page owned by another node and not present in its cache, it sends a request for the page to the owner node. If no other node holds an exclusive lock on the page, the owner node grants the lock and sends a copy of the page to the requester. If some other node holds an exclusive lock on the page, the owner node sends a callback message to that node and waits until that node (a) downgrades/releases its lock and (b) sends the copy of the page present in its buffer pool, if any. Then, the owner node grants the lock and sends the page to the requester.

When a node wants to update a page on which it does not hold an exclusive lock, the node requests an exclusive lock from the owner node. The owner node grants the lock immediately when the page is not locked by any other node. If the page is locked by some nodes, then the owner node sends a callback message to these nodes. Once the owner node receives the acknowledgments to all callback requests, it grants the exclusive lock and sends a copy of the page to the requester, if the requester does not have the page cached in its cache.

Nodes periodically take checkpoints. Each check-point record contains the dirty page table (DPT) and information about the transactions that were active at the time of the checkpointing. The DPT contains entries which correspond to pages that have been modified by local transactions and the updates are not present in the disk version of the database. An entry in the DPT of a node N for a page P contains at least the following fields.

PID: P's page id

PSN: P's PSN the first time P was updated.

CurrPSN: P's PSN the last time P was updated.

Redo LSN: LSN of the log record that made P dirty.

An entry for a page P is added to the DPT of N when N obtains an exclusive lock on P and no entry for this page already exists in the table. The PSN of P is assigned to the PSN and CurrPSN fields and the current end of the local log is conservatively assigned to the RedoLSN field. The RedoLSN corresponds to the LSN of the earliest log record that needs to be redone for a page during restart recovery. Every time P is updated by a local transaction, the CurrPSN value of the DPT entry is set to the PSN value of P after the update.

An entry corresponding to a page owned by N is removed from N's DPT when the page is forced to disk. An entry corresponding to a page owned by a remote node is dropped from N's DPT when N receives an acknowledgment from the owner node that the page has been flushed to disk, and the page has not been updated again after the last time it was replaced from the local cache. Dropping an entry for an updated page that is present in the local cache could result in incorrect recovery if N were to crash after taking a checkpoint. This is because the DPT stored in the checkpoint record would not contain an entry for this page.

Transaction rollback is handled by each node. Furthermore, nodes can support the save point concept and offer partial rollbacks. Both total and partial transaction rollbacks open a log scan starting from the last log record written by the transaction. Since updated pages are allowed to be replaced from the node's cache, the rollback procedure may have to fetch some of the affected pages from the owner nodes.

2. Single Node Crash Recover

When a node fails, its lock table and cache contents are lost. As a consequence, any further lock and data requests with respect to the data owned by the failed node are stopped until the node recovers. However, transaction processing on the remaining nodes can continue in parallel with the recovery of the crashed node.

The recovery of a crashed node involves the recovery of updates performed by locally executed transactions. In addition, the recovery of a crashed node may involve the recovery of updates performed by transactions that were executed in another node, referred to as remote transactions. This is because updated pages that are replaced from a node's cache are sent to the owner node. If the failed node does not own any data, the recovery of remote transactions is not required. (For instance, in a client-server environment, the crash of a client does not involve the recovery of transactions that were executed in another client or the server). During its recovery, the crashed node has to (a) determine the pages that may require recovery, (b) identify the nodes involved in the recovery, (c) reconstruct lock information, and (d) coordinate the recovery among the involved nodes.

The following sections (sections a–d) provide details on how the present invention solves the above problems. While providing these details, it is assumed that recovery is carried out by the crashed node when this node restarts. Nevertheless, the present invention allow any node that has access to the database and the log file of the crashed node to perform crash recovery. This is realized in shared disks architectures where all nodes have access to the same database and all log files, as well as in shared nothing and client-server architectures that use hot standby nodes.

a. Determining the Pages that May Require Recovery

When a node fails, all dirty pages present in the cache of this node have to be recovered. These pages belong to two categories: pages owned by the crashed node and pages owned by a remote node. While pages belonging to the first category may have been updated by both local and remote transactions, pages in the second category have been updated only by local transactions.

Since each node writes log records for updates to pages in its own log file, the pages that were updated by local transactions can be determined by scanning the local log starting from the last complete checkpoint. These pages correspond to the entries in the DPT that is constructed during the analysis phase of the ARIES algorithm. Among these pages, the candidates for recovery are: (a) pages owned by the crashed node that are not present in the cache of any other node, and (b) pages owned by a remote node that were exclusively locked by the crashed node at the time of the crash.

The basic ARIES algorithm cannot be used to determine all dirty pages that belong to the first category. This is because under ARIES, a page is not considered dirty if it is not included in the DPT logged in the last checkpoint before the crash, and no log records for this page are logged after the checkpoint. There are two reasons that a page owned by a node is not considered dirty when it is present in the node's cache at the time of the crash. The first is that the page was updated only by local transactions and it was forced to disk before the checkpoint was taken. This case does not cause any problems because the page is no longer dirty at this point. The second reason is that the page was updated only by remote transactions after the checkpoint was taken and the page was not included in the logged DPT. In this case, no log records for updates to the page are found in the local log file.

However, according to the way each DPT is updated for pages owned by remote nodes, pages that were updated before the crash will have an entry in at least one DPT of the remaining nodes. Among these pages, the pages that may have to be recovered are only those that are present in the DPT of a node and not present in the cache of any other node. The rest of the pages, which are present in the cache of some node, contain all the updates performed on them before the owner node's crash and they do not require recovery. Thus, when the crashed node N restarts, it requests from each operational node $N_r$ the list of all pages owned by N that are present in $N_r$'s cache, as well as all entries in $N_r$'s DPT that correspond to pages owned by N. After all operational nodes send the above lists to N, N is able to determine the pages that may have to be recovered based on these lists and its own DPT.

But, pages owned by the crashed node that are present in the DPTs of some nodes and the caches of some other nodes may not be recovered at all or recovered incorrectly if a node were to crash after the owner node finishes its restart recovery. Pages that are not in the DPT of the crashed node would not be recovered at all, while pages that are in the DPT would be recovered incorrectly if the disk version of them did not contain all the updates performed by the rest of the nodes in the past. The present invention solves this problem as follows. After the owner node constructs the list of the pages that may have to be recovered, it requests the pages that are present in the cache of a node and have entries in the DPTs of some other nodes from the nodes that have them in their caches. If there are multiple nodes that have the same page in their caches, only one node is notified to send the page.

b. Identifying the Nodes Involved in the Recovery

The crashed node identifies the nodes that are involved in the recovery of a page during the procedure of identifying the pages that require recovery. These nodes belong to two categories: nodes whose DPT entry for P has a PSN value greater than or equal to P's PSN value on disk, and nodes whose DPT entry for P has a PSN value less than P's PSN value on disk. Nodes in the first group have to recover their committed updates. However, some of the nodes in the second group may not have to recover P at all if their log files do not contain any log record that was written for P and whose PSN value is greater than or equal to P's PSN value. This happens when all the updates these nodes made on P took place before P was forced to disk. Thus, a node whose CurrPSN value in its DPT entry for P is less than or equal to P's PSN value is not involved in the recovery process and it can drop P's entry from its DPT.

c. Reconstructing Lock Information

Before the crashed node N starts recovering the pages that were identified to require recovery, N has to reconstruct its lock information so that normal transaction processing can continue in parallel with the recovery procedure. The lock information includes all the locks that had been granted to both local and remote transactions. The locks that were granted to remote transactions are present in the lock tables of the nodes where those transactions were executed. In addition, locks that were granted to local transactions for pages owned by remote nodes are also present in the lock tables of the remote nodes.

During restart recovery, each operational node $N_r$ releases all shared locks held by the crashed node. Exclusive locks are retained so that operational nodes are prevented from accessing a page that has not yet been recovered. The list of locks $N_r$ had acquired from the crashed node as well as the list of exclusive locks held by the crashed node are sent to the crashed node. After all the lock lists have been sent, the crashed node can establish its lock tables. In addition, the crashed node needs to acquire exclusive locks for the pages present in its DPT that do not have a lock entry. At this point, all lock tables contain all the needed locks and normal transaction processing can continue.

d. Coordinating the Recovery Among the Involved Nodes

After the crashed node N identifies both the pages that require recovery and the nodes that will participate in the recovery of these pages, the recovery of each page P has to be done in the correct order. This order corresponds to the order in which transactions that were executed at the involved nodes updated P. Since the granularity of locking is a page, only one node can update P at a time. Hence, the PSN values stored in the log records written for P determine the order of updates. In fact, the PSN value stored in the first log record written for P by each transaction that updated P is enough for determining the order of updates. The construction of the above list of PSN values for each page that requires recovery, referred to as NodePSNList, is explained below.

When a remote node $N_r$ receives the list of pages that require recovery from N, it scans its log file starting from the minimum of all RedoLSN values belonging to DPT entries for the pages that are included in the above list. The PSN value present in a log record examined during the scan is inserted into the NodePSNList when (a) the log record corresponds to an update performed on a page present in the above list, and (b) the transaction that wrote the log record is not the same as the transaction that wrote the log record whose PSN field is the last PSN inserted into the NodePSNList, if any. In addition, the location of this log record is remembered and it will be used during the recovery of the page. When the scan is over, $N_r$ sends the NodePSNList to N.

In parallel to the above process, N constructs its own NodePSNList for the pages that require recovery, the same way as the one described above.[1] Once all nodes involved in the recovery have sent their NodePSNLists to N, N coordinates the recovery of a page P in the following way.

[1] Since N has already scanned its log during the analysis phase of ARIES, a part of the NodePSNList during this scan could be built. Then, once all pages that require recovery are identified, N scans its log starting from the minimum of all RedoLSN values present in the DPT entries for these pages and stopping when the last complete checkpoint is found. A new entry is inserted into the NodePSNList when the two conditions mentioned above are true and the transaction that wrote the log record is not the same as the transaction that wrote the log record whose PSN field is the first PSN inserted into the NodePSNList, if any.

1. Order the nodes involved in the recovery of P in an ascending ordering based on P's PSN values present in the NodePSNLists sent, including your own NodePSNList. Adjacent entries that correspond to the same node are merged into one entry, whose PSN value is the minimum of the two PSNs.
2. Send P to the node $N_r$ having the minimum PSN entry in the above list. The second minimum PSN value present in the list is also sent to $N_r$, if any.
3. When $N_r$ sends back P, place P in the buffer pool and remove the entry from the list.
4. Repeat the previous two steps until there are no more entries for P in the list.

When a node receives P from N together with a PSN value, it recovers P by scanning its log starting from either the log record with LSN equal to the RedoLSN value present in the DPT entry for P or the log record remembered in the analysis process mentioned above. The node stops the recovery process when it finds a log record written for P whose PSN value is greater than the PSN value N sent along with P, or when the entire log is scanned. In the former case, the node sends P back to N and remembers the current location in the local log. This location will be the starting point for the continuation of the recovery process for P. In the latter case, the node sends only P back to N. If no PSN value was sent along with P, the node stops the recovery process when the entire log is scanned.

During the recovery process, nodes update the DPT entries corresponding to pages that are being recovered. In particular, a node that does not apply any log record to a page drops the entry from its DPT when it does not hold a lock on the page. If the node holds a lock on the page, it sets the RedoLSN value of the DPT entry to the current end of the log. The former case is realized when the owner node crashes before acknowledging the writing of the page to disk. The latter case corresponds to the case where all the updates the node performed in the past are present on the disk version of the page and the node has not updated the page since.

3. Multiple Node Crash Recover

So far, details of how the present invention recovers from the case of a single node crash have been described. However, a second node may crash while another node is in the process of recovering from its earlier failure. Recovery from multiple node crashes is similar to the recovery from a single node crash, although it is more expensive as more log files have to be examined and processed and the recovery of a crashed node may have to be restarted. Similar to the single node crash, operational nodes may continue accessing the pages they have in their local caches while the rest of the nodes are in the process of recovering.

As in the single node crash case, the present invention: (a) determines the pages that may require recovery, (b) identifies the nodes that are involved in the recovery, (c) reconstructs the lock information of each crashed node, and (d) coordinates the recovery of a page among the involved nodes. Once the present invention determines the pages that may require recovery, the nodes that are involved in their recovery, the reconstruction of the lock information, and the coordination of the recovery among the involved nodes is done in the same way as in the single node case. Hence, the rest of this section discusses only the solution to the first problem.

As in the single node case, each crashed node has to recover the pages that had been updated by local transactions, as well as the pages that it owns and which had been updated by remote transactions and were present in its cache at the time of the crash. Pages belonging to the first category can be identified from the log records written in the local log file. Unlike the single node crash case, not all pages belonging to the second category can be identified by using only the entries in the DPTs and caches of the operational nodes. The DPTs of the crashed nodes are also needed, for some of these pages may have been updated by several of these nodes.

Although each crashed node lost its DPT during the crash, a superset of each node's DPT can be reconstructed by scanning the node's log file. In particular, each crashed node scans its log by starting from the last complete checkpoint and updates the DPT stored in that checkpoint by inserting new entries for the pages that do not have an entry and are referenced by the examined log records. Once the analysis pass is done, the DPT entries that correspond to pages owned by another node are sent to the owner node. Each operational node also sends the DPT entries that correspond to pages owned by another node and the list of these pages that are present in the local cache to the owner node. The owner node merges all the received entries with the entries it has in its own DPT for the same pages, after removing all entries that correspond to pages cached an operational node. The resulting list corresponds to the pages this node has to recover. Similar to the single node crash, pages present in the cache of an operational node and the DPT of another node are sent to the owner node.

C. Recovery for Fine-Granularity Locking Systems

In describing recovery for fine-granularity locking systems, it is assumed that the database is owned by only one node referred to a "server." The rest of nodes are referred to as "clients" and include local disk space. This assumption is made to simplify the description of the present invention by avoiding the need to distinguish between the server and client role of the nodes.

The present invention solves the problem of crashes in fine-granularity locking systems in two parts. For handling client crashes, when a client sends a page to the server, either because of cache replacement or in response to a callback request, the server remembers the PSN value present on the page. In addition, the server remembers the PSN value present on the page the first time a client acquires an exclusive lock on the page or an object present on the page. As a result of the above technique, the following property is guaranteed.

Property 1. The updates of a client record written for a page P are reflected on the copy of P present in the server's cache or on disk, when the PSN value stored in it is less than the PSN value the server remembers for P and this client.

For handling server crashes, the server forces to its log a replacement log record when it is about to write an updated page to disk. This log record contains the PSN value of the page and the list of the PSN values the server remembers for the clients that have updated the page, together with the ids of these clients. It can be easily proven that this solution has the following property.

Property 2. If the PSN value of a page P on disk is $PSN_{disk}$ and the server's log contains a replacement log record for P whose PSN field is the same as $PSN_{disk}$, the PSN values stored in this log record determine the client updates that are present on the page. In particular, the updates of a client log record whose PSN value is less than the PSN value stored in the replacement log record for this client are present on the page.

Finally, because the same object may be updated by several clients before the page containing this object is written to disk, restart recovery must preserve the order in which these clients updated the object. This order corresponds to the order in which the server sent callback messages for the object, and it should be reconstructed during server restart recovery (Property 1 guarantees correct recovery in the case of a client crash). In order to be able to reconstruct the callback order, each client that triggers a callback for an exclusive lock writes a callback log record in its log. This log record contains the identity of the called back object, the identity of the client that responded to the callback, and the PSN value the page had when it was sent to the server by the client that responded to the callback request. Section V.C.2 explains how the callback log records are used during server restart recovery.

1. Normal Processing of the Exemplary System

When the server receives a lock request for an object that conflicts with an existing lock on the same object or the page P containing the object, it examines the following cases.

Object-level conflict. If the requested lock mode is shared and some client C holds an exclusive lock on the object, C downgrades its lock to shared and sends a copy of P to the server, which forwards P to the requester. The same procedure is followed when the requested lock is exclusive. In this case, all clients holding conflicting locks release them, and they drop P from their cache if no other locks are held on objects residing on the page.

Page-level conflict. All clients holding conflicting locks on P de-escalate their locks and obtain object-level locks; each LLM maintains a list of the objects accessed by local transactions, and this list is used in order to obtain object level locks. After de-escalation is over, the server checks for object-level conflicts.

Clients periodically take checkpoints. Each checkpoint record contains information about the local transactions that are active at the time of the checkpointing. The checkpoint record also contains the dirty page table (DPT), which consists of entries corresponding to pages that have been modified by local transactions and the updates have not made it to the disk version of the database yet. Each entry in the DPT of a client C contains at least the following fields.

PID: id of a page P

RedoLSN: LSN of the log record that made P dirty

A client adds an entry for a page to its DPT the first time it obtains an exclusive lock on either an object residing on the page or the page itself. The current end of the log is conservatively assigned to the RedoLSN field. The RedoLSN corresponds to the LSN of the earliest log record that needs to be redone for the page during restart recovery. An entry is dropped from the DPT when the client receives an acknowledgment from the server that the page has been flushed to disk and the page has not been updated again since the last time it was sent to the server.

The server also takes checkpoints. Each checkpoint record contains the dirty client table (DCT), which consists of entries corresponding to pages that may have been updated by some client. Each entry in the DCT has at least the following fields.

PID: id of a page P

CID: id of client C

PSN: P's PSN the last time it was received from C

RedoLSN: LSN of the first replacement log record written for P

The server inserts a new entry into the DCT the first time it grants an exclusive lock requested by a client on either an object residing on the page or the page itself. The new entry contains the id of the client, the id of the page, the PSN value present on the page, and the RedoLSN field is set to NULL.

The server removes an entry for a particular client and page from the DCT after the page is forced to disk, and the client does not hold any exclusive locks on wither objects residing on the page or the page itself.

Every time the server forces a page P to disk, it first writes a replacement log record to its log file. The replacement log record contains the PSN value stored on the page and all the DCT entries about P. If the RedoLSN field of the DCT entry about P is NULL, the LSN of the replacement log record is assigned to it.

When the server receives a page P that was either called back or replaced from the cache of a client C, it first locates the entry in the DCT that corresponds to C and P and sets the value of the PSN field to be the PSN value present on P. Next, the server merges the updates present on P, as explained in Section V.A.

Transaction rollback is handled by each client. Furthermore, clients can support the savepoint concept and offer partial rollbacks. Both total and partial transaction rollbacks open a log scan starting from the last log record written by the transaction. Since updated pages are allowed to be replaced from the client's cache, the rollback procedure may have to fetch some of the affected pages from the server. When a client needs to access again a page that was replaced from its local cache, the server sends the page to the client together with the PSN value present in the DCT entry that corresponds to this client and the page in question. The client ignores the PSN value sent along during normal transaction processing.

2. Client Crash Recovery

When a client fails, its lock tables and cache contents are lost. The server releases all shared locks held by the crashed client and queues any callback requests until the client recovers. Transaction processing on the remaining clients can continue in parallel with the recovery of the crashed client.

During restart recovery, the crashed client installs in its lock tables the exclusive locks it held before the failure. The recovery of the crashed client involves the recovery of the updates performed by local transactions. Since each client writes all log records for updates to pages in its own log file, all the pages that had been updated before the crash can be determined by scanning the local log starting from the last complete checkpoint. These pages correspond to the entries of the DPT which is constructed during the analysis phase of the ARIES algorithm. However, according to Property 1 and the way the DCT is updated, only the pages that have an entry in the DCT need to be recovered.

Next, the client executes the ARIES redo pass of its log by starting from the log record whose LSN is the minimum of all RedoLSN values present in the entries of the DPT. A page that is referenced by a log record is fetched from the server only if the page has an entry in the DPT and the RedoLSN value of the DPT entry for this page is smaller than or equal to the LSN of the log record. When the page is fetched from the server, the server sends along the PSN value stored in the DCT entry that corresponds to this client and the client installs this PSN value on the page. The log record is applied on the page only when it corresponds to an update for an object that is exclusively locked and the PSN field of this record is greater that or equal to the PSN value stored on the page.

During the redo pass, callback log records may be encountered. These callback log records are not processed, according to the discussion presented in Section the beginning of Section V.C. After the redo pass is over, all transactions that were active at the time of the crash are rolled back by using transaction information that was collected during the ARIES analysis pass. Transaction rollback is done by executing the ARIES undo pass.

3. Server Crash Recovery

When the server crashes, pages containing updated objects that were present in the server cache at the time of the crash may have to be recovered. These pages may contain objects that were updated by multiple clients since pages are not forced to disk at transaction commit, or when they are replaced from the client cache, or when they are called back. During its restart recovery, the server has to (a) determine the pages requiring recovery, (b) identify the clients that are involved in the recovery of these pages, (c) reconstruct the DCT, and (d) coordinate the recovery among the involved clients.

The pages that may need to be recovered are those that have an entry in the DPT of a client and they are not present in the cache of this client. Although some of these pages may be present in the cache of some other client, it is wrong to assume that these pages contain all the updates performed on them before the server's crash. This is because fine-granularity locking is in effect. The server constructs the list of the pages that may require recovery, as well as the G.M. tables, by requesting from each client a copy of the DPT, the list of the cached pages, and the entries in the LLM tables.

The clients that are involved in the recovery are identified during the procedure of determining the pages that require recovery. In particular, all clients that have an entry for a page in their DPTs and they do not have the page cached in their cache will participate in the recovery of the page.

Next, the server reconstructs its DCT. The construction of the DCT must be done in such a way that the state of a page with respect to the updates performed on this page by a client can be precisely determined. When a page is present in the cache of a client its state corresponds to the PSN value present on the page. When a page is not present in the cache of a client its state must be determined from the state of the page on disk and the replacement log records written for this page. In particular, the server executes the following steps.

1. Insert into the DCT entries of the form <PID, CID, NULL, NULL> for all the pages that are present in the DPTs of the operational clients.

2. Read from disk all the pages that were determined to be candidates for recovery and remember the PSN values stored on them.
3. Update the NULL PSN and RedoLSN entries in the constructed DCT in the following way:
   (a) Retrieve from the log the DCT stored in the last complete checkpoint and compute the minimum of the RedoLSN values stored in this table.
   (b) Scan the log starting from the above computed minimum and for each replacement log record that corresponds to a page P having an entry in the constructed DCT do the following:
      i. If the RedoLSN value of the DCT entry for P is NULL then set its value to the LSN of this log record.
      ii. If the PSN value stored in the log record is the same as the remembered PSN value computed in Step 2, then replace the PSN fields of all entries in the DCT that correspond to the client ids stored in the log record with the corresponding PSN values present in the log record.
4. Request from each operational client the pages that are present in its cache and have an entry in the DPT of this client. The updates present on these pages are merged and the PSN fields in the DCT are updated accordingly.

Finally, the server coordinates the recovery of a page P by determining for each involved client C the state of each object residing on P which had been updated by many clients before the crash. This is done in the following way.

1. Each client $C_i$ that has P in its cache scans its log and constructs a list, referred to as $CallBack_P$, of all the objects residing on P that were called back from C. The scan starts from the location corresponding to the RedoLSN value present in the DPT entry about P. $CallBack_P$ contains the object identifiers and the PSN values present in the callback log records written for these objects and the client C. If multiple callback log records are written for the same object and the same client, the PSN value stored in the most recent one is stored in $CallBack_P$.
2. The server collects all $CallBack_P$ lists and merges all the entries referring to the same object by keeping only the entry containing the maximum PSN value. The resulting list is sent to C together with P and the PSN value present in the DCT entry.

Client C installs on P the PSN value sent by the server and starts its recovery procedure for P by examining all log records written for updates to P. The starting point of the log scan is determined from the RedoLSN value present in the DPT entry for P. For each scanned log record, C does the following.

1. If the log record was written for an object belonging to the $CallBack_P$ list sent by the server, the log record applied to P only when the PSN value stored in it is equal to or greater than the object's PSN value present in the above list.
2. If the log record was written for an object that does not belong to the $CallBack_P$ list, then the log record is applied to P.
3. If the log record is a callback log record that was written for an object present in the $CallBack_P$ list, the log record is skipped. Otherwise, C requests P from the server and sends the CID and PSN values present in the log record along. C continues the recovery procedure after the server sends P and C merges the updates present on it with the copy it has in its cache.

When the server receives the request for page P from C in the above Step 3, it compares the PSN value sent against the PSN values stored in the DCT for the client CID. If the latter is greater or equal to the former, then the server will send P to C. Otherwise, the server will request P from CID and then forward P to C. This situation materializes when CID is recovering P in parallel with C. In this case, CID will send P to the server only after it has processed all log records containing a PSN value that is less than the PSN value C sent to the server.

4. Complex Crash Recovery

So far, how the present invention recovers for the case of a single client or server crash has been described. However, the server may crash while a client is in the process of recovering from its earlier failure. Similarly, a client may crash while the server is in the process of recovering from its earlier failure. In this case, operational clients will recover their updates on the pages that were present in the server's buffer pool during the crash in the same way as in the server-only crash case. Crashed clients will recover their updates in a way similar to the client-only crash case. In particular, each crashed client will scan its local log starting from the last complete checkpoint and build an augmented DPT. The server will scan its log file, starting from the minimum RedoLSN value present in the DCT stored in the last checkpoint record, and build the DCT entries that correspond to both the pages the crashed clients updated and the pages the operational clients had replaced. From the replacement log records and the PSN value present on each of these pages, the server will calculate the PSN value to be used while recovering those pages in the way explained in Section V.C.3.

D. Log Space Management

Log space management becomes an issue when a node consumes its available log space and it has to overwrite existing log records. Since the earliest log record needed for recovering from a node crash corresponds to the minimum of all the RedoLSN values present in the DPT of this node, the node can reuse its log space only when the minimum RedoLSN is pushed forward. As the present invention has been described so far, the minimum RedoLSN may be pushed forward only when an entry is dropped from the DPT. But, this may not be enough to prevent the node from not having enough log space to continue executing transactions.

The present invention solves the above problem by executing the following steps. When a node replaces a dirty page P from its cache, it remembers the current end of its log. When the owner node forces P to disk, it informs all nodes that had replaced P. These nodes replace the RedoLSN field of the DPT entry referring to P with the remembered end of the log LSN for this page. When a node faces log space problems, it replaces from its cache the page having the minimum RedoLSN value in the DPT and asks the node owning this page to force the page to disk. If, however, the page is not present in the node's cache, the node just asks the owner node to force the page to disk. If the node needs more log space, it repeats the above procedure. Note that the owner node may be the same as the node that needs to make space in its local log file. In this case, if the page is present in the node's cache, the page is forced to disk. Otherwise, the page is first requested from a node that has it in its cache and then it is written to disk.

As described, the present invention is a distributed database management computer system in which: (1) updated pages are not forced to disk at transaction commit time or when they are replaced from a node cache, (2) transaction rollback and node crash recovery are handled exclusively by the nodes, (3) local log files are never merged during the recovery process, (4) each node can take a checkpoint without synchronizing with the rest of the operational nodes, and (5) clocks do not have to be synchronized across the nodes and lock tables are not checkpointed.

Various embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of operating a first node in a distributed database management computer system having a first set of database pages managed by the first node and a second set of database pages managed by a second node, wherein said first node can update pages in the first and second set, comprising the steps of:

(a) updating a database page at the first node;
   (b) generating a first log record at the first node;
   (c) determining whether the first database page is managed by the first node;
   (d) if at step (c) it is determined that the first database page is managed by the first node, writing the first log record to a log storage local to the first node; and
   (e) if at step (c) it is determined that the first database page is not managed by the first node:
      (e-1) determining whether the first node includes a local log storage;
      (e-2) if at step (e-1) it is determined that the first node includes a local log storage, writing the first log record to the local log storage; and
      (e-3) if at step (e-1) it is determined that the first node does not include a local log storage, sending the first log record to a node that manages the first database page.

2. The method of claim 1, wherein each of the plurality of nodes includes lock information, further comprising the steps of:

(f) recovering from a failure of the first node by performing the following steps:
      (f-1) determining which of the plurality of database pages require recovery;
      (f-2) identifying which of the plurality of nodes are involved in the recovery;
      (f-3) reconstructing the lock information; and
      (f-4) coordinating the recovery among the involved nodes.

3. The method of claim 1, wherein the first node comprises a cache memory for buffering the log record and wherein either step (d) or step (e) is performed when said cache memory is full.

4. The method of claim 3, wherein either step (d) or step (e) is performed when the first database page is written to storage local to the first node.

5. The method of claim 3, wherein step (e) is performed when the first database page is sent to a second node that manages the first database page.

6. The method of claim 1, wherein either step (d) or step (e) is performed at a transaction commit.

7. A first node in a distributed database management computer system having a first set of database pages managed by the first node and a second set of database pages managed by a second node, wherein said first node can update pages in the first and second set, comprising:

means for updating a first database page at the first node;
   means for generating a first log record at the first node;
   first means for determining whether the first database page is managed by the first node;
   first means for writing the first log record to a log storage local to the first node if said first means for determining determines that the first database page is managed by the first node;
   second means for determining whether the first node includes a local log storage if said first means for determining determines that the first database page is not managed by the first node;
   second means for writing the first log record to the local log storage if said second means for determining determines that the first node includes a local log storage; and
   means for sending the first log record to a a node that manages the first database page if said second means for determining determines that the first node does not include a local log storage.

8. The computer system of claim 7, wherein each of the plurality of nodes includes lock information, further comprising:

means for recovering from a failure of the first node, said means for recovering comprising:
      means for determining which of the plurality of database pages require recovery;
      means for identifying which of the plurality of nodes are involved in the recovery;
      means for reconstructing the lock information; and
      means for coordinating the recovery among the involved nodes.

* * * * *